(12) United States Patent
Stewart et al.

(10) Patent No.: US 6,294,400 B1
(45) Date of Patent: Sep. 25, 2001

(54) METHOD FOR MAKING MICRO-MECHANICAL SEMICONDUCTOR ACCELEROMETER

(75) Inventors: Robert E. Stewart, Woodland Hills; Arnold E. Goldman, Calabasas, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/634,214

(22) Filed: Aug. 9, 2000

Related U.S. Application Data

(62) Division of application No. 09/127,643, filed on Jul. 31, 1998, now Pat. No. 6,105,427.

(51) Int. Cl.[7] .......................... H01L 21/00; G01P 15/125
(52) U.S. Cl. .................... 438/52; 73/514; 73/32
(58) Field of Search .................... 73/514.32, 514.18, 73/514.21, 514.23, 514.36; 438/50, 51, 52, 53; 257/254

(56) References Cited

U.S. PATENT DOCUMENTS

| | | | |
|---|---|---|---|
| 4,609,968 | * | 9/1986 | Wilner .................................. 361/320 |
| 5,007,289 | * | 4/1991 | Stewart et al. ........................ 73/510 |
| 5,065,627 | * | 11/1991 | Stewart et al. ........................ 73/505 |
| 5,142,291 | * | 8/1992 | Stewart et al. ........................ 73/866.1 |
| 5,381,300 | * | 1/1995 | Thomas et al. ........................ 361/280 |
| 5,501,893 | * | 3/1996 | Laermer et al. ........................ 428/161 |
| 5,504,032 | * | 4/1996 | Gessner et al. ........................ 73/514.32 |
| 5,559,290 | * | 9/1996 | Suzuki et al. ........................ 73/514.36 |
| 5,614,742 | * | 3/1997 | Gessner et al. ........................ 257/254 |
| 5,623,099 | * | 4/1997 | Schuster et al. ........................ 73/514.32 |
| 5,905,203 | * | 5/1999 | Flach et al. ........................ 73/514.32 |

* cited by examiner

*Primary Examiner*—John F. Niebling
*Assistant Examiner*—Viktor Simkovic
(74) *Attorney, Agent, or Firm*—Elliott N. Kramsky

(57) ABSTRACT

A precision, micro-mechanical semiconductor accelerometer of the differential-capacitor type comprises a pair of etched opposing cover layers fusion bonded to opposite sides of an etched proofmass layer to form a hermetically sealed assembly. The cover layers are formed from commercially available, Silicon-On-Insulator ("SOI") wafers to significantly reduce cost and complexity of fabrication and assembly. The functional semiconductor parts of the accelerometer are dry-etched using the BOSCH method of reactive ion etching ("RIE"), thereby significantly reducing contamination inherent in prior art wet-etching processes, and resulting in features advantageously bounded by substantially vertical sidewalls.

8 Claims, 2 Drawing Sheets

METHOD FOR MAKING MICRO-MECHANICAL SEMICONDUCTOR ACCELEROMETER

CLAIM TO PRIORITY UNDER 35 U.S.C. 120

This application is a divisional of U.S. patent application Ser. No. 09/127,643 of Robert E. Stewart and Arnold E. Goldman titled "Micro-Mechanical Semiconductor Accelerometer" filed Jul. 31, 1998, now U.S. Pat. No. 6,105,427.

BACKGROUND

1. Field of the Invention

The present invention relates to accelerometers. More particularly, the invention pertains to a high-precision, micro-mechanical semiconductor accelerometer of the differential-capacitor type.

2. Description of the Prior Art

Precision micro-mechanical accelerometers have wide application in the fields of inertial navigation and guidance, both with respect to long-range, re-usable vehicles, such as aircraft, and to relatively short-range, one-use vehicles, such as munitions. Such inertial sensors are employed both to measure linear accelerations and to measure vehicular angular rates within an inertial navigation system when employed in Coriolis-based systems. A representative type of system for measuring both linear accelerations and rotation rates with reference to a set of three orthogonal axes is the multi-sensor as taught, for example in United States patents (property of the assignee herein) U.S. Pat. No. 4,996,877, entitled "Three Axis Inertial Measurement Unit With Counterbalanced Mechanical Oscillator"; U.S. Pat. No. 5,007,289, entitled "Three Axis Inertial Measurement Unit With Counterbalanced, Low Inertia Mechanical Oscillator"; and U.S. Pat. No. 5,065,627 entitled "Three Axis Inertial Measurement Unit With Counterbalanced, Low Inertia Mechanical Oscillator".

Precision micro-mechanical accelerometers can take several functional forms including the so-called differential-capacitor type. In general, this type employs a central plate or proofmass disposed between two fixed outer plates and moveable at a flexure in response to an acceleration force along its sensitive axis. In an open-loop system, the two values of capacitance defined between the central plate and respective ones of the outer plates are differenced, with the change in capacitance resulting from a displacement of the central plate being picked off by electrodes and employed as the measure of the acceleration force.

In a closed loop system, measured changes in the differential capacitance are fed back in the form of electrostatic field forces applied to the respective plates of the two capacitors to restore and maintain the central plate precisely between the two outer plates. The electrostatic force required to restore and maintain the central plate at the null condition is the measure of the inertial force acting on the plate. Such accelerometers, when used in conjunction with an appropriately-sensitive capacitive measurement system, are capable of detecting and measuring extremely minute accelerations, (approximately 1 $\mu$G). An example of such a system employing charge control forcing and rate multiplier outputs is taught in U.S. Pat. No. 5,142,921 entitled "Force Balance Instrument with Electrostatic Charge Control", property of the assignee herein.

Accelerometer arrangements in which a silicon proofmass is sandwiched between a pair of opposed glass plates with plated-on metallic electrodes have experienced inefficiency due to the differing coefficients of thermal expansion of the glass plates and the silicon disk sandwiched therebetween. Such thermal incompatibility can produce warping with temperature changes, resulting in excessive bias and scale factor temperature sensitivities. An additional problem encountered with accelerometers employing glass plates is that mobile ion redistribution with thermal cycling causes non-repeatability of bias and scale factor.

U.S. Pat. No. 5,614,742 ('742 Patent) entitled "Micromechanical Accelerometer With Plate-Like Semiconductor Wafers" (also property of the assignee herein, the teachings of which are hereby incorporated by reference) teaches an all-silicon, precision micro-mechanical accelerometer that substantially overcomes the aforesaid problems. The accelerometer of the patent comprises an assembly of five anisotropiocally-etched silicon wafers (each formed by a conventional wet process) bonded to one another to form a hermetically-sealed assembly. By employing a structure entirely of silicon layers coated with thin oxide layers, the thermal coefficient mismatches of the prior art are substantially overcome. As a result, the device of the '742 Patent is able to withstand a wider range of temperature variation with reduced temperature sensitivity and improved repeatability and stability.

While the above-described device provides quite satisfactory results in terms of both tactical performance and cost, the patented assembly entails the etching of five separate wafers followed by their subsequent registration and bonding. The etching process for defining the electrodes and their screening frames employs conventional etching solutions such as potassium hydroxide (KOH). Such solutions can, under certain circumstances, produce alkaline ions that penetrate into and contaminate the silicon oxide layers, degrading accelerometer performance. The anisotropic nature of the etching process, which proceeds along the crystallographic planes of the silicon layers defines sloped, rather than straight, sidewalls. In the assembled accelerometer, such sloped edges result in regions of "non-forcing mass" where edge portions are spaced too far from the electrodes to be interactively responsive to the voltages nominally applied. Thus, higher voltages must be applied to overcome the extra mass. This situation occurs whether the electrodes act as forcers (as in the case of a closed-loop system), or signal pick-offs (as in the case of both open- and closed-loop systems).

SUMMARY OF THE INVENTION

The preceding and other shortcomings of the prior art are addressed by the present invention which provides, a method for producing a semiconductor accelerometer of the differential capacitor type. Such method includes the step of selecting a semiconductor proofmass wafer and a pair of SOI wafers of the type that have an oxide layer between semiconductor handle and device layers. Such method includes the step of fixing a first thickness of dielectric material on the opposite sides of each SOI wafer and fixing a second thickness of dielectric material on opposite sides of the proofmass layer.

The device layer and the first thickness of dielectric material overlying the device layer of each SOI wafer is etched through to the underlying oxide layer to define on the device layer an associated central electrode in a continuous, marginal frame around the electrode. A proofmass wafer and the second thickness of dielectric material on the opposite sides thereof are etched to define within that wafer a central proofmass having opposite faces, a continuous, marginal frame around the proofmass and a flexible hinge connecting the proofmass to the frame.

The proofmass wafer is assembled between opposed ones of the SOI wafers so that the frames of the wafers are in alignment, the proofmass is centered between and spaced apart from respective, opposed ones of the electrodes by distance equal to the sum of the first and second thicknesses of dielectric material and the proofmass is articulated to rotate between the electrodes and the hinge. Each SOI wafer is bonded to a respective one of the opposed sides of the proofmass wafer so that a respective one of the first thickness of dielectric material on the frames around the electrodes is fused to a respective one of the second thicknesses of dielectric material on the opposed sides of the frame around the proofmass to form a hermetically sealed assembly.

The foregoing and other features and advantages of this invention will become further apparent from the detailed description that follows. This description is accompanied by a set of drawing figures. Numerals of the drawing figures, corresponding to those of the written description, point to the various features of the invention. Like numerals refer to like features through-out both the written description and the drawing figures.

DETAILED DESCRIPTION OF THE PREFERRED EMBODIMENT

Figure 1:
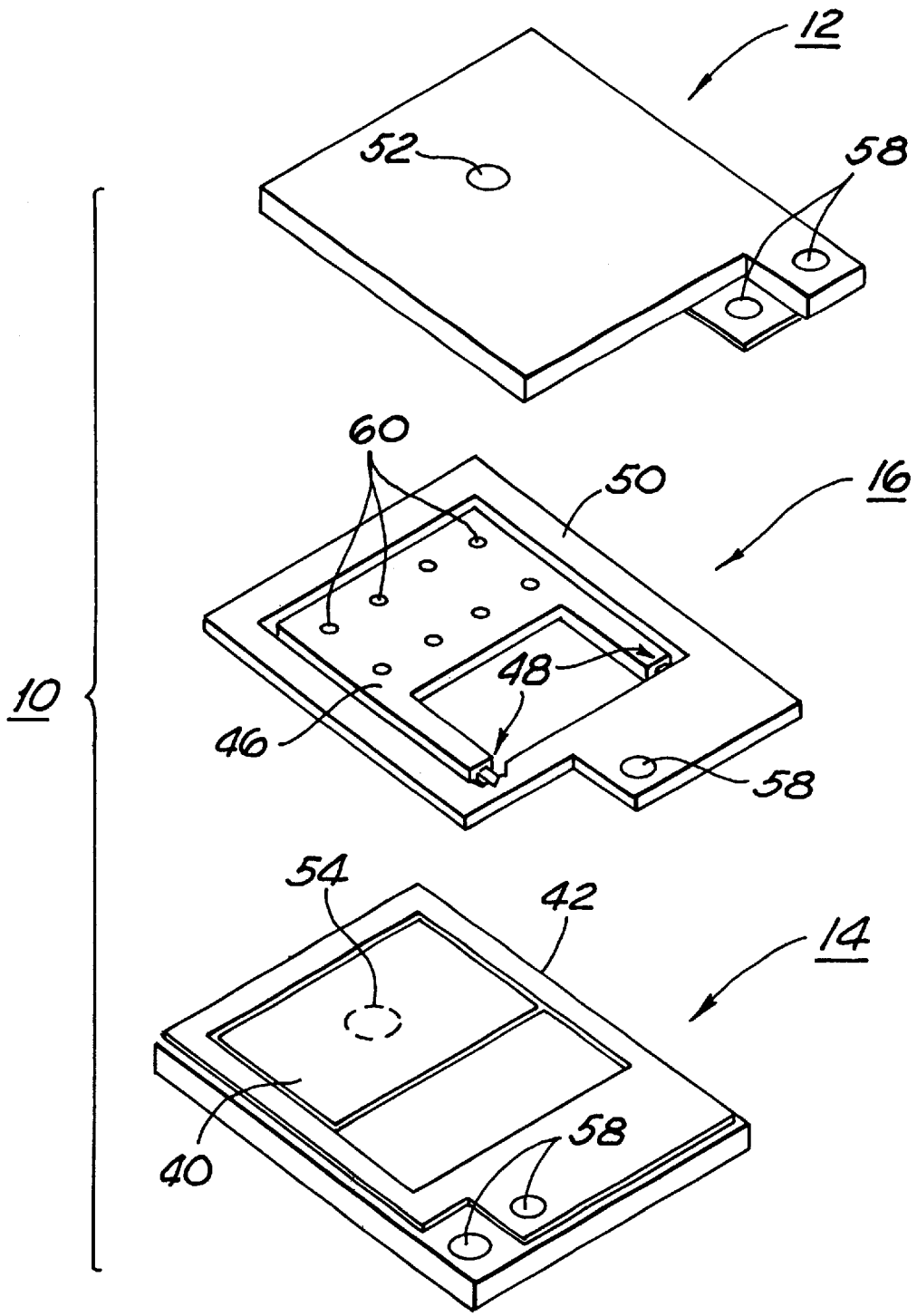
FIG. 1 is an exploded perspective view of a micro-mechanical batch fabricated semiconductor accelerometer in accordance with the present invention disclosing its three-wafer structure.

FIG. 1 is an exploded perspective view for illustrating structures of a high-precision, micro-mechanical semiconductor accelerometer 10 in accordance with the invention. The view shows that the accelerometer 10 generally comprises three wafer elements including a top cover wafer element 12, a bottom cover wafer element 14, and a proofmass wafer element 16 located therebetween.

Figure 2:
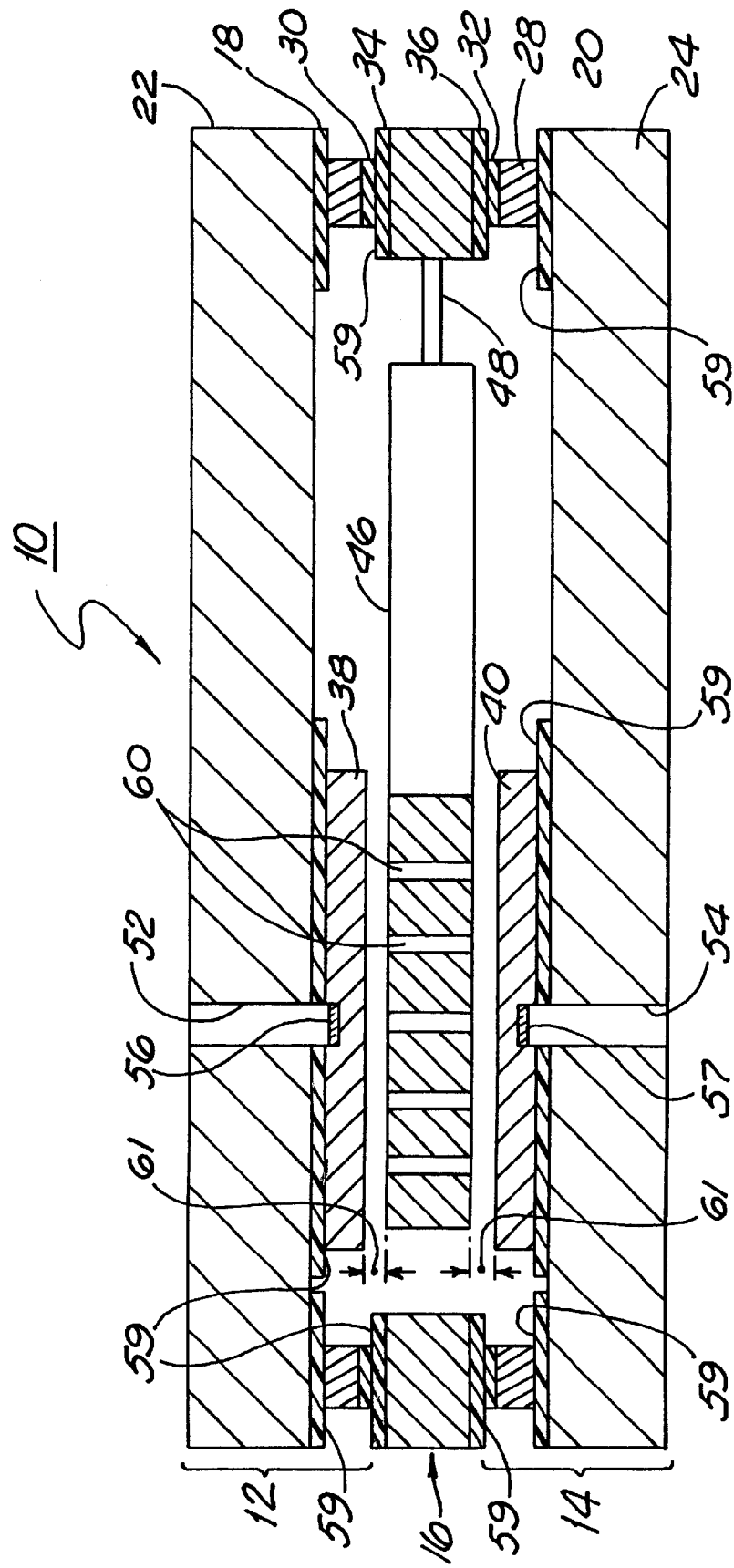
FIG. 2 is a cross-sectional side elevation view of the accelerometer with numerals to the right and left sides thereof identifying material layers and numerals associated with internal lead lines identifying accelerometer structures.

As may be seen more clearly in FIG. 2, a cross-sectional side elevation view of the assembled accelerometer 10 with numerals to the right and left of the accelerometer 10 identifying material layers and numerals associated with internal lead lines identifying accelerometer structures, each of the top and bottom cover wafer elements 12 and 14 comprises an integral composite of a central oxide layers 18, 20, an exterior semiconductor layer 22, 24 and an interior semiconductor layer 26, 28 respectively. Each of the semiconductor layers 22 through 28 preferably comprises silicon although the invention is not limited to this semiconductor.

Each of the top and bottom cover wafers 12 and 14 is of the Silicon-On-Insulator ("SOI") type to simplify the fabrication and assembly of the accelerometer 10 in contrast to the device of the '742 Patent, referenced above that requires the assembly and bonding of five wafer elements.

SOI wafer elements are commercially available from a number of sources, including Shinitzu of Japan. Such wafer elements generally comprise a central buried oxide layer, having a thickness of from about 0.5 to 2.0 microns sandwiched between so-called "handle" (exterior) and "device" (interior) layers of semiconductor material. Referring principally to FIG. 2 in regard to the material composition of the accelerometer 10 and to FIG. 1 with respect to particular structural features thereof, dielectric layers 30, 32 of a first predetermined thickness are grown on the interior semiconductor layers 26, 28 for fusion bonding to corresponding dielectric layers 34, 36 grown upon the opposed surfaces of the proofmass wafer 16. The material of the dielectric layers may be either an oxide or a nitride that is thermally grown on the associated, underlying layer of semiconductor material.

Prior to fusion bonding of the accelerometer assembly 10, each of the interior semiconductor layers 26, 28 and associated dielectric layers 30 and 32 respectively, is dry etched to define an electrode 38, 40 and surrounding peripheral guard rings, only one of which, the guard ring 42 and electrode 40 of the bottom cover wafer 14, is visible (FIG. 1), it being understood that like facing structures are formed upon the upper cover wafer 12.

Unlike the cover wafers, the proofmass wafer 14 is fabricated from a semiconductor wafer that is not a composite. Prior to assembly into the accelerometer 10, the dielectric layers 34, 36 (preferably of oxide or nitride of a second predetermined thickness) are dry etched, along with the silicon wafer, in accordance with a predetermined pattern to define therein a proofmass element 46 free of dielectric material, at least one flexible hinge 48 and a surrounding guard ring 50. It is noted that the gaps between the opposed surfaces of the proofmass element 46 and the facing surfaces of the electrodes 38, 40 are readily set by selection of dielectric layer thicknesses.

Prior to the fusion bonding of the wafers 12, 14 and 16 to complete the accelerometer assembly 10 (and, as is well known in the art, concomitant with device etch fabrication steps described earlier), means for accomplishing the required accesses to the accelerometer 10 to achieve a fully-functional device are formed. Such means includes access apertures 52, 54 dry etched through the handle and buried oxide layers of the wafers 12 and 14 to provide contact to the electrodes 34 and 36 respectively. Metallized connection pads 56, 57 are plated at the bottom of the apertures 52, 54 respectively, providing a conductive medium for receiving a wire in bonded or soldered relationship.

The top, bottom and central wafer elements 12, 14 and 16 are each dry etched along an overlying edge thereof to define a series of adjacent plateaus that successively expose regions of the silicon wafers for receiving plated metallic connection pads 58 as shown in FIG. 1 (not visible in FIG. 2). Furthermore it may be seen most clearly in FIG. 2 that, when etching the upper layers 18, 26 and 30 and the corresponding lower layers 20, 28 and 32, the masking thereof is such that the dielectric layer 30 and interior semiconductor layer are etched to expose underlying regions of the buried oxide layer 18. A like geometry pertains to the etching of the dielectric layer 32 and adjacent interior semiconductor layer 28 relative to the underlying buried oxide layer 20. As a result, protective regions 59 of dielectric material (only some of which are indicated by numeral in FIG. 2) are created within the assembled structure. Such protective regions 59 significantly add to the electrical isolation between layers of semiconductor material whereby the opportunity for leakage currents to bridge the dielectric layers of the accelerometer 10 is minimized. That is, while the thickness of a layer of dielectric material may be on the order of 1 or 2 microns, the dielectric protective regions 59 extend about 20 to 100 microns from the etched (or sawed) edges of the silicon layers. Such added electrical isolation at the edges of the accelerometer 10 is particularly helpful for protection against shorting that can result from the predictable contamination associated with the dicing or sawing of the batch processed wafers.

It may be additionally desirable to form a plurality of small apertures 60 that extend through the proofmass 46 to reduce the damping effect of any residual gaseous medium on pendulous response.

After completion of the various structures, the proofmass wafer element 16 is sandwiched between opposing device layers 26, 28 of the top and bottom cover wafers 12 and 14 respectively. The proofmass 46 is centered between the two opposing electrodes 38 and 40 and spaced apart from each by a gap 61 whose thickness is equal to sum of the thicknesses of the facing dielectric layers 30, 34 and 32, 36 that remain after etching to form the guard ring and electrode of the (top and bottom) covers. The remaining regions of the etched dielectric layers of the proofmass wafer element 16 and the top and bottom cover wafer elements 12 and 14 are then fusion-bonded to one another to form a hermetically sealed assembly. The proofmass 46 is moveable about the hinges 48 to displace between the electrodes 38 and 40 in response to an acceleration force acting in a direction normal to the plane of the proofmass 46.

It should be noted that each of the features of the accelerometer 10 that is defined by etching, and particularly those of the proofmass 46 includes peripheral sidewalls that are substantially vertical, or orthogonal to the plane of the associated wafer. This is to be contrasted with the slanted, or tapered, sidewalls that result from wet, anisotropic etching processes in which material removal occurs preferentially along crystallographic planes. As described above, this is a very desirable characteristic as dead-weight regions are thereby removed from the proofmass 46 to permit more efficient energy usage.

The straight sidewalls of the accelerometer 10 as described above are formed by employing a dry etching process of the reactive ion etching ("RIE") type. At present, there are two different commercially-known RIE deep trench dry silicon etching processes, "BOSCH" and "ALCATEL". The accelerometer 10 is preferably formed as described through etching steps in accordance with the BOSCH process.

By employing RIE etching, substantially vertical sidewalls of the etched features are obtained without concern for the crystallographic orientation of the etched substrate. Such processes avoid the possibility of alkaline ion contamination of the silicon dioxide dielectric layers required for electrical isolation between the proofmass, electrodes, guard rings and covers. The inventors have found that, by using a dry, RIE etching process to avoid the creation of non-forcing masses at the edges of the etched apertures, a more compact device results, which, in turn, enables more devices to be fabricated per wafer to produce a significant cost advantage. Additionally, it has been found that, by eliminating the non-forcing masses, a ten to twenty percent increase in efficiency (in terms of volts/G) is achieved in an accelerometer employed in a relatively high-G environment.

Thus it is seen that the present invention provides an accelerometer assembly 10 that offers the advantages of the device of U.S. Pat. No. 5,614,742 in terms of improved dielectric isolation, shielded electrodes, thermal performance and minimized electrostatic spring while providing substantial performance and economic enhancements. The use of R.I.E., as opposed to anisotropic, etching leads to straight sidewalls that offer enhanced performance and production gains. Such gains result both from enhanced compactness and lesser material contamination. The use of SOI wafers, as opposed to discrete corresponding elements, simplifies manufacture to thereby further reduce cost. By reducing the number of wafers from five to three, two bonding layers or steps are eliminated. The use of SOI eliminates any need to perform separate registrations of the silicon layers of the SOI wafers. Finally, as RIE etching is employed, no attention need be made to the crystallographic orientations of any of the three wafers (SOI and otherwise) employed, further reducing the cost of manufacture of a device in accordance with the invention.

While the invention has been described with reference to its presently preferred embodiment, it is not limited thereto. Rather, this invention is limited only insofar as it is defined by the following set of patent claims and includes within its scope all equivalents thereof.

What is claimed is:

1. A method for producing a semiconductor accelerometer of the differential capacitor type, comprising the steps of:
   a) selecting a semiconductor proofmass wafer, and a pair of SOI wafers of the type that have an oxide layer between semiconductor handle and device layers;
   b) fixing a first thickness of dielectric material on said opposite sides of each said SOI wafer;
   c) fixing a second thickness of dielectric material on opposite sides of said proofmass wafer;
   d) etching said device layer and said first thickness of dielectric material overlying said device layer of each said SOI wafer through to said underlying oxide layer to define on said device layer an associated central electrode and a continuous, marginal frame around said electrode;
   e) etching said proofmass wafer and said second thicknesses of dielectric material on said opposite sides thereof to define within said wafer a central proofmass having opposite faces, a continuous, marginal frame around said proofmass and a flexible hinge connecting said proofmass to said frame;
   f) assembling said proofmass wafer between opposed ones of said SOI wafers such that said frames of said wafers are in alignment, said proofmass is centered between and spaced apart from respective, opposed ones of said electrodes by a distance equal to the sum of said first and second thicknesses of dielectric material, and said proofmass is articulated to rotate between said electrodes at said hinge; and then
   g) bonding each said SOI wafer to a respective one of said opposed sides of said proofmass wafer such that a respective one of said first thicknesses of dielectric material on said frames around said electrodes is fused to a respective one of said second thicknesses of dielectric material on said opposed sides of said frame around said proofmass, thereby forming a hermetically sealed assembly.

2. A method as defined in claim 1 wherein the step of etching said proofmass wafer further comprises the step of etching a plurality of holes through said proofmass between said opposite sides thereof.

3. A method as defined in claim 1 wherein the steps of selectively etching said wafers to define said electrodes, said proofmass, said frames and said hinge further comprise the step of etching said features to include sidewalls substantially orthogonal to respective planes of said wafers.

4. A method as defined in claim 1 wherein the steps of etching said features further comprise the step of dry-etching said features by means of an RIE process.

5. A method as defined in claim 4 wherein the step of etching said features further comprises the step of etching said features by means of the BOSCH process.

6. A method as defined in claim 1 wherein the step of etching said device layer and said first thickness of dielectric material further includes the step of etching said oxide layer to said underlying handle layer.

7. A method as defined in claim 6 wherein the step of etching said oxide layer further includes the step of etching said oxide layer so that etched regions of said oxide layer extend beyond at least one sidewall of said electrode.

8. A method as defined in claim 6 wherein the step of etching said oxide layer further includes the step of etching said oxide layer so that etched regions of said oxide layer extend beyond at least one sidewall of said marginal frame.

* * * * *